(12) United States Patent
Montagne et al.

(10) Patent No.: US 10,184,091 B2
(45) Date of Patent: Jan. 22, 2019

(54) YTTRIUM AND MAGNESIUM BASED VANADIUM CORROSION INHIBITORS

(71) Applicant: General Electric Company, Schenectady, NY (US)

(72) Inventors: Pierre Olivier Montagne, Belfort (FR); Sundar Amancherla, Al-Khobar (SA); Krishnamurthy Anand, Bangalore (IN); David Terry Trayhan, Jr., Greenville, SC (US); Matthieu Paul Frederic Vierling, Dampierre-les-Bois (FR); Maher Aboujaib, Evette-Salbert (FR); Abdurrahman Abdallah Khalidi, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 46 days.

(21) Appl. No.: 15/368,483

(22) Filed: Dec. 2, 2016

(65) Prior Publication Data

US 2017/0158978 A1    Jun. 8, 2017

(30) Foreign Application Priority Data

Dec. 3, 2015    (FR) ...................... 15 61782

(51) Int. Cl.
*C10L 10/04* (2006.01)
*F23J 7/00* (2006.01)
(Continued)

(52) U.S. Cl.
CPC ............. *C10L 10/04* (2013.01); *C10L 1/1266* (2013.01); *C10L 1/301* (2013.01); *C10L 1/305* (2013.01);
(Continued)

(58) Field of Classification Search
CPC ........ C10L 1/1266; C10L 1/301; C10L 1/305; C10L 10/04; C23F 11/185; C23F 11/187;
(Continued)

(56) References Cited

U.S. PATENT DOCUMENTS 5,637,118 A    6/1997 Bornstein et al.
2006/0059768 A1*    3/2006 Wallenbeck .......... C10L 1/1216
44/354

FOREIGN PATENT DOCUMENTS

FR    2229861 A1    12/1974
FR    3004733 A1    10/2014
(Continued)

OTHER PUBLICATIONS

PCT International Search Report & Written Opinion for PCT Application No. PCT/US2016/064870 dated Feb. 17, 2017; 12 Pages.

*Primary Examiner* — Timothy C Cleveland
(74) *Attorney, Agent, or Firm* — Charlotte C. Wilson; Ernest G. Cusick; Frank A. Landgraff

(57) ABSTRACT

A process based on the combined use of yttrium and magnesium to inhibit vanadium corrosion of high temperature parts of thermal equipment. The combined use of yttrium and magnesium, applied in a variable yttrium/magnesium ratio, compared with conventional magnesium inhibition, may reduce emission of magnesium vanadate and minimize losses of performance due to fouling of the high temperature parts, including in the presence of alkali metals. Further, compared with inhibition based on yttrium alone, it may reduce the inhibition cost and reinforce the protection against combined vanadium pentoxide and sodium sulfate corrosion.

14 Claims, 1 Drawing Sheet

(51) Int. Cl.
*C10L 1/12* (2006.01)
*C10L 1/30* (2006.01)
*C23F 11/18* (2006.01)
*F01D 25/00* (2006.01)
*F02C 3/20* (2006.01)
*F02C 7/22* (2006.01)
*F01D 5/28* (2006.01)

(52) U.S. Cl.
CPC .......... *C23F 11/185* (2013.01); *C23F 11/187* (2013.01); *F01D 5/286* (2013.01); *F01D 25/002* (2013.01); *F01D 25/007* (2013.01); *F02C 3/20* (2013.01); *F02C 7/22* (2013.01); *F23J 7/00* (2013.01); *F05D 2260/95* (2013.01)

(58) Field of Classification Search
CPC ...... F01D 5/286; F01D 25/002; F01D 25/007; F02C 3/20; F02C 7/22; F05D 2260/95; F23J 7/00
See application file for complete search history.

(56) References Cited

FOREIGN PATENT DOCUMENTS

| | | |
|---|---|---|
| WO | 2004026996 A1 | 4/2004 |
| WO | 2016162718 A1 | 10/2016 |

\* cited by examiner

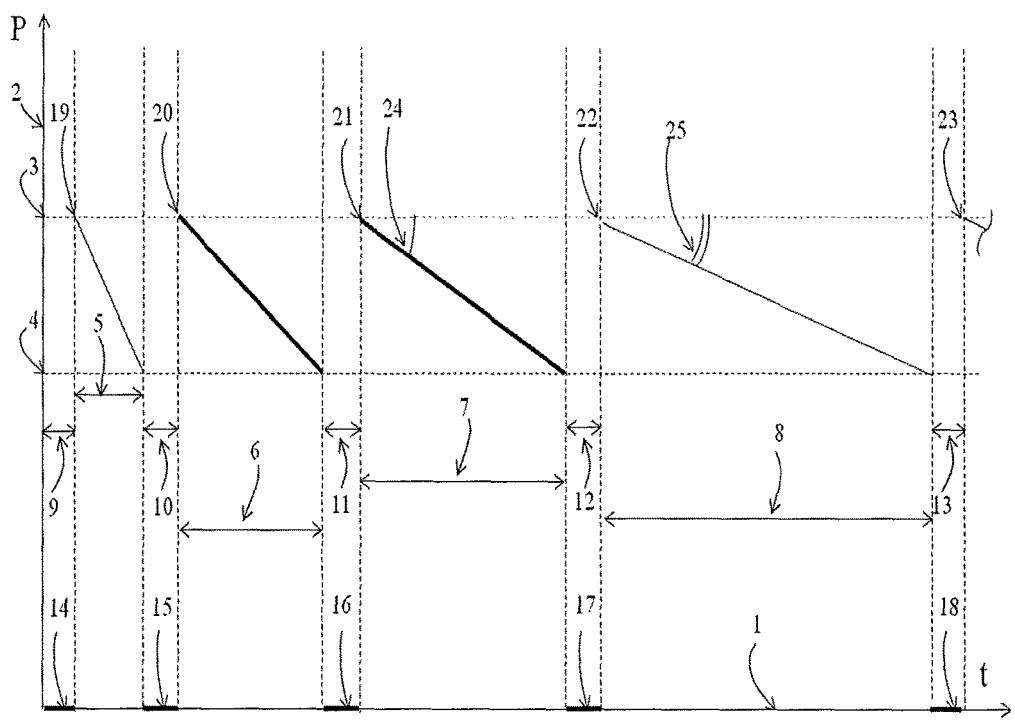

YTTRIUM AND MAGNESIUM BASED VANADIUM CORROSION INHIBITORS

CROSS-REFERENCE TO RELATED APPLICATIONS

This application claims priority to and the benefit of the French Patent Application No. 1561782 entitled "Yttrium and Magnesium Based Vanadium Corrosion Inhibitors," filed Dec. 3, 2015, which is incorporated by reference in its entirety.

BACKGROUND

The subject matter disclosed herein relates generally to thermal equipment, and more particularly to inhibition of high temperature corrosion thereof.

Thermal equipment, such as boilers, diesel engines, gas turbines, furnaces, and process reactors may be used to burn certain liquid fuels. In such equipment, the fuels may contain traces of metallic contaminants such as vanadium, sodium, potassium, calcium, and lead that need to be treated prior to their combustion in order to attenuate the high temperature corrosion effects of these metals on thermal equipment. The metallic salts contained in the fuels are water soluble and may be extracted upstream of the thermal equipment. For example, fuel washing operations with water, followed by water/fuel separation with the aid of electrostatic separators or centrifuges, are commonly implemented to separate water soluble metallic salts such as chlorides and sulfates of sodium, potassium and partially calcium. However, the vanadium derivatives contained in the fuels are organic in nature and are not water soluble and therefore cannot be extracted by such a washing operation. The presence of such organic compounds of vanadium in liquid fuels burned in the thermal equipment is likely to cause high temperature corrosion of the metallic materials in contact with the combustion gases.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a process for inhibiting vanadium corrosion in thermal equipment includes introducing vanadium corrosion inhibitors into the thermal equipment. The vanadium corrosion occurs in high temperature parts of the thermal equipment that burns a fuel containing vanadium, such that vanadium pentoxide ($V_2O_5$) is formed during combustion of the fuel. The vanadium corrosion inhibitors include an yttrium-based inhibitor comprising yttrium oxide ($Y_2O_3$) and a magnesium-based inhibitor comprising magnesium oxide (MgO).

In another embodiment, a process includes inhibiting vanadium corrosion in thermal equipment by conversion of vanadium pentoxide ($V_2O_5$) into other chemical species using vanadium corrosion inhibitors, the $V_2O_5$ being formed during combustion of a vanadium-containing fuel in the thermal equipment. The vanadium corrosion inhibitors inhibit vanadium corrosion by reducing an amount of $V_2O_5$ according to a reaction:

$$V_2O_5 + yY_2O_3 + m(1-y)MgO \rightarrow 2yYVO_4 + (1-y)Mg_3V_2O_8 + (1-y)(m-3)MgO,$$

wherein y is between about 0.05 to 0.95, and m is between about 3 to 15.

In another embodiment, a process includes inhibiting vanadium corrosion in thermal equipment using vanadium corrosion inhibitors, the thermal equipment being used to burn vanadium-containing fuels. The vanadium corrosion inhibitors include an yttrium-based and a magnesium-based vanadium corrosion inhibitor. The inhibiting of the vanadium corrosion is performed such that vanadium pentoxide ($V_2O_5$), vanadium oxide, and yttrium sulfate are not released from the thermal equipment.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a plot illustrating a comparison between different turbine performance levels as a function of time, in accordance with certain embodiments of the disclosure.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention concern the inhibition of high temperature corrosion of materials of thermal equipment such as boilers, diesel engines, gas turbines, furnaces and process reactors, which, in their furnace, burn vanadium-contaminated fuels. In particular, so-called heavy or residual fuels and crude oils, which in this document will be designated with the generic term "fuels," generally contain traces of metallic contaminants such as vanadium, sodium, potassium, calcium and lead that need to be treated prior to their combustion in order to attenuate the high temperature corrosion effects of these metals. In what follows, gas turbines or "turbines," which generally include: (i) a compressor; (ii) a furnace, which itself includes of a set of "combustion chambers" and (iii) a turboexpander, will be taken as paradigms of thermal equipment, although all the considerations contained in this document apply to thermal equipment in general. The "flame temperature" of a gas turbine, which largely determines its efficiency, is the temperature that prevails at the inlet of the turboexpander and not that which is present in the flames, which exceeds 2000° C. on the flame front.

The metallic salts contained in the fuels can, when they are water soluble, be extracted upstream of the thermal equipment; this is how "fuel washing" operations with water, followed by water/fuel separation with the aid of electrostatic separators or centrifuges, are commonly implemented to separate water soluble metallic salts such as chlorides and sulfates of sodium, potassium and partially calcium.

The vanadium derivatives contained in the fuels are organic in nature and have as major drawback that they are not water soluble but fat soluble and therefore cannot be extracted by such a washing operation. The presence of such organic compounds of vanadium in liquid fuels burned in thermal equipment is likely to cause high temperature corrosion of the metallic materials in contact with the combustion gases. In fact, depending on the oxidation-reduction conditions that prevail in the flames, the vanadium reacts with oxygen to form one of the oxides VO, $V_2O_3$, $V_2O_4$ (or $VO_2$) or $V_2O_5$: whereas the first three oxides are refractory, with melting points in excess of 1500° C., vanadium pentoxide $V_2O_5$, which is formed in the highly oxidizing flames in gas turbines in particular, melts at a temperature of 670° C. This oxide is therefore present in liquid form in the operating conditions of the turbine and the fraction that is deposited on the surfaces of the hot parts may thereby cause electrochemical type corrosion in a molten salt environment. This "vanadium corrosion" may be more or less severe depending on the nature of the metal or the alloy of the thermal equipment, the operating temperature range, and the operating time and conditions. In addition, such corrosion aggravated and more difficult to prevent when the fuel contains also alkali metals (sodium; potassium).

The corrosion potential of vanadium pentoxide $V_2O_5$ can be inhibited by "trapping" the latter within the refractory compounds with the aid of chemical compounds called "inhibitors." The classical representatives of these inhibitors are alkaline earth compounds such as calcium oxide, when the fuel does not contain sulfur, or magnesium salts, which can be applied in water soluble or fat soluble form. Such magnesium-based inhibitor additives, once introduced into a flame, decompose there into magnesium oxide (MgO), which reacts with $V_2O_5$ to form magnesium vanadate. A sufficient quantity of magnesium is introduced to generate magnesium orthovanadate, formula $Mg_3V_2O_8$, whose high melting point (1070° C.) allows the vanadium charged particles to pass through the "hot gas path" of the turbine in solid form without causing corrosion of the hot parts of the said turbine. The inhibitor dosage must be sufficient to both allow all of the vanadium present in the fuel to be trapped and to prevent the formation of vanadates having lower Mg/V stoichiometric ratios, notably pyrovanadate ($Mg_2V_2O_7$) or metavanadate ($MgV_2O_6$) which are not refractory enough to achieve the intended inhibition effect.

This magnesium inhibition leads to the formation of "magnesium-vanadium" combustion ashes having high melting points and containing:

on the one hand, magnesium orthovanadate ($Mg_3V_2O_8$) which is produced by the following reaction (1):

$$V_2O_5 + 3MgO \rightarrow Mg_3V_2O_8 \tag{1}$$

on the other hand, an excess of magnesium in the form of magnesium oxide (MgO) that is partly converted into magnesium sulfate ($MgSO_4$).

Indeed, in the furnace, the sulfur contained in the fuel is oxidized into sulfur oxides ($SO_x$, or $SO_2+SO_3$), which also react with the magnesium oxide MgO to form magnesium sulfate ($MgSO_4$). Therefore, to a certain extent, there is competition between $V_2O_5$ and $SO_x$, the sulfur oxides, in the reaction with MgO. This "parasitic" reaction that forms magnesium sulfate means that in order to trap all the vanadium, a high excess of magnesium with respect to the stoichiometry of reaction (1) has to be added, which, in practice, results in a magnesium/vanadium ratio greater than or equal to 3 in weight. This high excess of magnesium is also useful, not only from a theoretical viewpoint, to ensure the conversion of vanadium into magnesium orthovanadate, but also from a practical viewpoint, to overcome possible inaccuracies or errors related to the in-service determination of the vanadium content of the fuel.

The magnesium inhibition treatment can be characterized by the dosing ratio $MgO/V_2O_5$ expressed on a molar basis, which will be designated as "m." This dosing ratio "m" is taken to be equal to 12.6 in the "conventional inhibition" process and is equivalent to the Mg/V ratio of 3 on the previously mentioned weight basis. The corresponding material balance equation is therefore, in practice, written as the following equation (2):

$$V_2O_5 + 12.6MgO + 9.6sSO_3 \rightarrow Mg_3V_2O_8 + 9.6sMgSO_4 + 9.6(1-s)MgO \tag{2}$$

In this equation, "s" designates the proportion of the excess of magnesium that is converted into sulfate and (1−s) that which is converted into oxide, the number s decreasing with temperature.

In the more general case of magnesium dosage, the material balance equation is written as the following equation (3):

$$V_2O_5 + mMgO + (m-3)sSO_3 \rightarrow Mg_3V_2O_8 + (m-3)[sMgSO_4 + (1-s)MgO] \tag{3}$$

In this equation, m≥3, where m=12.6 in the case of conventional inhibition. If abstraction is made of the magnesium sulfatation process, balance equations (2) and (3) are equivalent to the following equations (2b) and (3b) respectively:

$$V_2O_5 + 12.6MgO \rightarrow Mg_3V_2O_8 + 9.6MgO \tag{2b}$$

$$V_2O_5 + mMgO \rightarrow Mg_3V_2O_8 + (m-3)MgO \tag{3b}$$

The number (m−3) in the right member of equation (3b) represents the relative excess of magnesium, that is to say the excess of magnesium in relation to one mole of $V_2O_5$; it is equal to 9.6 in the case of conventional inhibition.

The main advantage of magnesium inhibition resides in its low cost. Its main drawback resides in the fact that the magnesium-vanadium ashes which are formed by the mineral mix in the right member of equation (3) have a tendency to deposit significantly on the hot parts of the turbine and therefore to foul the latter, thereby gradually decreasing the energy performance of the said turbine. In fact, a substantial fraction of the magnesium-vanadium ashes resulting from this inhibition process deposits itself on the walls of the combustion chambers and on the thermal equipment components located downstream of the latter: this will be referred to as an ash deposition process. This process causes progressive fouling of the thermal equipment as it is operated and entails a correlative and progressive loss of its energy performance (power output and efficiency).

To remedy this unwanted effect, either dry cleaning or water washing of these ash deposits is conventionally carried out. Dry cleaning includes introducing into the operating equipment a slightly abrasive material, free of corrosive or ash generating compounds, so as to remove part of the deposits accumulated on the walls of the hot parts. Water washing of the turbine is another, more effective, method to restore performance and includes injecting hot water after shutdown and cool down of the turbine, thereby dissolving the water soluble fraction of the magnesium-vanadium ashes, that is to say, the magnesium sulfate, which results in the destabilization of the entire ash layer and allows the almost complete entrainment of the said deposit; this method therefore allows the initial performance levels to be restored almost completely.

In conclusion, because of their relatively fouling nature, magnesium-vanadium ashes, in addition to the previously mentioned losses of power and efficiency, require frequent shutdowns of the turbine to carry out such water washes, thereby reducing the availability of the production facility. In what follows, these losses of efficiency, power and availability will collectively be designated by the expression "loss of performance by fouling."

A second significant drawback of magnesium inhibition is that it is sensitive to the presence of alkali metals that tend to reduce its effectiveness due to the formation of mixed magnesium and for example sodium vanadates, in particular $NaMg_4(VO_4)_3$, which melts at a temperature above 750° C. and therefore lowers the melting point of the magnesium-vanadium ashes, making them more adhesive. In the description that follows, this negative effect of alkali metals on the fusibility of the magnesium-vanadium ashes will be designated as the "adverse effect of alkali metals."

A third significant drawback is that at high temperatures magnesium-vanadium deposits become highly fouling which is due, on the one hand, to the partial or complete melting of $Mg_3V_2O_8$ (if the temperature locally exceeds 1070° C.) and, on the other hand, to the decomposition of the magnesium sulfate into magnesium oxide ("s" tending toward 0 in equations (2) or (3) above), which oxide, being totally insoluble in water, cannot be eliminated by the washing operation. It follows that when the "flame temperature" of the turbine exceeds a limit on the order of 1090° C., the effectiveness of the washing operation becomes very low and restoration of the performance levels problematic: this temperature of 1090° C. therefore constitutes the "technical limit" of operation of turbines burning vanadium contaminated fuels.

As an alternative to magnesium inhibition, the use of yttrium-based inhibitors has been suggested. U.S. Pat. No. 5,637,118 in fact suggests such a vanadium corrosion inhibitor which is also claimed to be effective against combined vanadium pentoxide and sodium sulfate corrosion. This document suggests the use of yttrium in the form of a compound which at high temperatures generates yttrium oxide ($Y_2O_3$) which combines with $V_2O_5$ to form yttrium vanadate ($YVO_4$), which is highly refractory, with a melting point in excess of 1800° C. and therefore remains solid at the operating temperatures of the gas turbine. The composition of such yttrium-based additives includes at least a stoichiometric amount of yttrium ester having at least four carbon atoms and a hydrocarbon fuel soluble chelating agent that includes 2,4-pentanediene.

The reaction for stoichiometric inhibition of vanadium by yttrium is therefore written as the following equation (4):

$$V_2O_5 + Y_2O_3 \rightarrow 2YVO_4 \quad (4)$$

The inventors of the present application have empirically observed that this yttrium-based inhibition has the major advantage that it generates only very small ash deposits on the hot parts of thermal equipment and therefore substantially reduces losses of performance due to fouling inherent in magnesium inhibition. Yttrium also has the advantage that it is a very powerful inhibitor, reaction (4) always prevails over the reaction forming the sulfate $Y_2(SO_4)_3$, and as such requires, in theory, only a mixing ratio $Y_2O_3/V_2O_5$ equal to or slightly greater than the stoichiometric ratio, which, according to reaction (4), is equal to 1 on an atomic basis. However, in practice and as in magnesium inhibition, this ratio needs to be significantly higher than 1 to overcome possible inaccuracies or errors relating to the in-service determination of the vanadium content in the fuel. Thus, the aforementioned U.S. Pat. No. 5,637,118 recommends a preferred atomic mixing ratio $y=Y_2O_3/V_2O_5$, which is at least equal to 1.25 on an atomic base, the relative excess of yttrium, which is defined as the number (y−1), being then greater than or equal to 0.25.

In these conditions, taking into account the strong affinity of yttrium oxide ($Y_2O_3$) for sulfur trioxide, this excess of yttrium generates yttrium sulfate $Y_2(SO_4)_3$ such that the material balance equation of the inhibition with, for example, an atomic Y/V ratio of 1.25, is written as the following equation (5):

$$V_2O_5 + 1.25Y_2O_3 + 0.25s'SO_3 \rightarrow 2YVO_4 + 0.25s'Y_2(SO_4)_3 \quad (5)$$

In this equation, s' designates the proportion of the excess of yttrium that is converted into sulfate; s' decreases only very little with temperature, remaining substantially equal to 1 over the temperature range of the inhibition application.

The corrosion potential of vanadium pentoxide $V_2O_5$ can be inhibited by trapping the latter within the refractory compounds with the aid of chemical compounds called inhibitors. In the case of any excess of yttrium, the material balance equation of the inhibition will therefore be written as the following equation (6):

$$V_2O_5 + yY_2O_3 + (y-1)s'SO_3 \rightarrow 2YVO_4 + (y-1)s'Y_2(SO_4)_3 \quad (6)$$

The number represented by y is at least equal to 1 and relative excess of yttrium is (y−1). It is important to note that when y is less than 1, which corresponds to incomplete inhibition, no yttrium sulfate is formed because chemically the formation of vanadate prevails over that of sulfate.

If abstraction is made of the yttrium sulfatation process, this material balance equation (6) is equivalent to the following simple equation (6b):

$$V_2O_5 + yY_2O_3 \rightarrow 2YVO_4 + (y-1)Y_2O_3 \quad (6b)$$

It should be noted that the choice of the relative excess (y−1) of 0.25 recommended by U.S. Pat. No. 5,637,118 (reaction (5) versus reaction (4)) is, however, by no means conservative, as this relative excess is 9.6 in the case of conventional magnesium inhibition.

A second advantage of yttrium inhibition, put forward in U.S. Pat. No. 5,637,118, is the fact that it is insensitive to the presence of alkali metals, because, according to the same patent, it is effective against combined vanadium pentoxide and sodium sulfate corrosion. However, the drawback of yttrium, as a rare earth metal, is its high cost. Once released into the ambient air, vanadium components, like the majority of the so-called "heavy" metals, and in particular vanadium pentoxide $V_2O_5$ which is an acid, reactive and "mobile" oxide, do not have a neutral impact on the environment. Installations that burn "fuels" are dependent on this situation which is actually independent of the thermal equipment used, as it results directly from the use of such unrefined fuels: the conversion of $V_2O_5$ into alkaline earth vanadate, which results from the magnesium-based vanadium inhibition treatment, tends to reduce this impact because the vanadium is then immobilized by a light metal (Mg) with high basic power, within the magnesium orthovanadate which is much less reactive than $V_2O_5$ but can nevertheless be subject to leaching processes in aqueous or humid environments. Consequently, the combination of magnesium with vanadium has an attenuating effect on the impact of $V_2O_5$ on the environment, and the magnesium oxide and sulfate present in excess (reaction (3)) are moreover environmentally benign compounds.

The case of yttrium inhibition appears a priori to be more complex because although this element too has a high basic power capable of immobilizing vanadium, its use, necessarily in excess and according to reaction (6), leads to the formation of yttrium sulfate which is water soluble and may therefore contribute to the diffusion of yttrium in a humid or aqueous environment. By contrast, yttrium vanadate $YVO_4$ not only has a very high melting temperature (1810° C.) but is also extremely stable: this highly refractory and inert character enables it to be "immobilized" in solid form as soon as the flame goes out. An essential fact as observed by the inventors of this application, is that it is strictly insoluble in water. Biotoxicity tests carried out by the inventors of this application in accordance with standard OCDE 209 relating to plants, have shown that yttrium vanadate $YVO_4$ affects neither the germination or the growth of plants. This a priori surprising fact, because it involves the combination of two so-called heavy metals (vanadium and yttrium), could possibly be explained by the fact that the vanadium and the yttrium are solidly "immobilized one by the other" in the molecule $YVO_4$, which is insoluble in water and chemically inert, is therefore not reactive in biological processes.

Moreover, the inventors of this application have also empirically observed that when an yttrium compound and a magnesium compound are placed in the presence of vanadium oxide, yttrium vanadate is always formed preferentially to magnesium vanadate. Consequently, if one introduces, on the one hand, yttrium in default with respect to the vanadium—which is equivalent to using a value of y less than 1 in equation (6b)—and, on the other hand, sufficient magnesium to inhibit, according to reaction (3b), the vanadium fraction that is not inhibited due to the insufficient yttrium, then $YVO_4$, with the exclusion of $Y_2(SO_4)_3$ on the one hand, and classical products of the magnesium-vanadium inhibition, notably ($MgSO_4$+MgO) and $Mg_3V_2O_8$ will be formed, which, as previously indicated, has an attenuating effect on the impact of $V_2O_5$ on the aqueous environment.

Thus, the inventors of the present application have discovered the interest in using a vanadium inhibition method based on the combined use in variable ratios of:
  on the one hand, yttrium used in default with respect to the vanadium, yttrium being an expensive metal but capable of minimizing losses of performance due to fouling of the hot parts and moreover free of environmental impact by aqueous media because it is used in default
  on the other hand, magnesium, a less expensive metal than yttrium and attenuating the environmental effects of $V_2O_5$, but causing significant losses of performance due to fouling of the hot parts.

In this novel so-called "combined inhibition" method, for each mole of $V_2O_5$ formed during combustion, the following are introduced:
  a number y, strictly positive and strictly less than 1, of moles of yttrium oxide that inhibit y moles of $V_2O_5$ according to the following balance equation (7) derived from equation (6b) where the value of y is chosen to be between 0 and 1:

$$V_2O_5 + yY_2O_3 \rightarrow 2YVO_4 + (y-1)Y_2O_5 \qquad (7)$$

a number represented by m(1−y) of moles of magnesium, m being greater than or equal to 3 thereby totally inhibiting the residual $V_2O_5$ which is the vanadium pentoxide not inhibited by the yttrium; the inhibition balance of this residual $V_2O_5$, which derives from equation (3b) is written as the following equation (8):

$$(1-y)V_2O_5 + m(1-y)MgO \rightarrow (1-y)Mg_3V_2O_8 + (1-y)(m-3)MgO \qquad (8)$$

The overall balance of this "combined yttrium and magnesium inhibition" is the complete inhibition of the vanadium, with excess magnesium, which can therefore be expressed by the following overall equation (9):

$$V_2O_5 + yY_2O_3 + m(1-y)MgO \rightarrow 2yYVO_4 + (1-y)Mg_3V_2O_8 + (1-y)(m-3)MgO. \qquad (9)$$

This equation reveals y and m as process variables. The choice of the parameter m is arbitrary, it being understood, however, that the choice of a value of m greater than 15, in addition to the increased cost related to the magnesium consumption, would make the reduction in "losses of performance by fouling" very difficult. The parameter "m" will therefore preferably vary from 3 to 15 and can be equal to 12.6. For example, if one keeps the value of the conventional magnesium inhibition, the relative excess (m−3) is then equal to 9.6 and the atomic Mg/Y ratio, written as 0.5 m(1−y)/y, then depends only the value of y.

The vanadium corrosion inhibition process according to the present disclosure therefore uses two vanadium inhibitors—yttrium and magnesium—whose combination allows, in addition to effective inhibition of the said vanadium corrosion:
  to control the environmental impact of the ashes to the extent that neither vanadium pentoxide $V_2O_5$, nor oxide, nor yttrium sulfate and limited quantities of magnesium orthovanadate $Mg_3V_2O_8$, which is the sole product capable of diffusing into the environment through wet deposition, are formed;
  to control the ash deposition, which becomes lower as the parameter y is close to unity (i.e., close to 1).
This possibility to control the ash deposition is particularly interesting. In fact, it is possible:
  on the one hand, to increase the flame temperature beyond the "technical limit" on the order of 1090° C., which has been previously defined without encountering any major problem of eliminating the ash deposits during the turbine water washes;
  on the other hand, based on the experience acquired during the operation of the thermal equipment, to determine:
    either the minimum value $y_1$ of the parameter y to ensure that the operating time between two consecutive washing operations does not fall below a predetermined value T, while at the same time complying with a maximum authorized loss of performance: this operating criterion will be designed as the minimum operating time between two washes criterion;

or the minimum value $y_2$ of the same parameter y to ensure that the performance loss rate (dP/dt) by fouling does not exceed, in absolute value, a predetermined threshold δ: this operating criterion will be designed as the performance loss minimization criterion.

FIG. 1 illustrates this double point. In this FIGURE, the turbine performance P, which is either the power output (in kW/h), or the efficiency (in %), is a function of time t (in hours). The performance level (3) is the original performance level of this turbine. The performance level (4) is the threshold from which the operator decides to proceed with a washing operation, and is, for example, taken to be equal to 95% of the original performance (3), it being understood that the operator may also choose to wash the turbine after a defined and invariable number of operating hours, which is a less common strategy, as is the case in example 2 below. The time intervals (5), (6), (7) and (8) represent four turbine operating periods for which four different choices for the parameter y are made. These periods are inserted between the washing operations (9) to (13) during which the power output (14) to (18) is zero, but at the end of which the turbine again has a performance level (19) to (23) identical to the original level (3).

During the operating period (6), the value adopted for y is equal to $y_1$, which is the value that ensures an operating period between two washes that is equal to the lower limit T, predetermined by the operator, without exceeding a loss of performance of 5%. In other words, this operating period (6) just satisfies the previously defined "minimum operating time between two washes criterion." During the operating time (5), the value adopted for y is less than $y_1$ so that the duration of this operating period (5) is shorter than T: this operating period (5) does not satisfy the minimum operating time between two washes criterion. During the operating time (7), the value adopted for y is equal to $y_2$, this value ensures, in absolute value, a performance loss rate, represented by the slope (24) that is equal to the upper limit δ predetermined by the operator. In other words, this operating period (7) just satisfies the performance loss minimization criterion. Finally, during the operating time (8), the value adopted for y is greater than $y_2$ so that the performance loss rate over this period (8), which is represented by the slope (25), is less than the performance loss rate δ predetermined by the operator and therefore satisfies, with a certain margin, the performance loss criterion.

The operator may, in a prior experience acquisition phase, determine the values of $y_1$ and $y_2$ by following, for a given fuel grade, the performance of its machine as a function of the parameter y of the combined inhibition. The above-described FIG. 1 has been included in this description for illustration purposes only and does not cover all of the Y and Mg mixtures that are made possible by the present embodiment and that depend on parameters y and m: for example, the following cases could have been envisaged: $y>y_1$; $y<y_2$; $y_1<y<y_2$; $3<m<12.6$; etc. The combined inhibition process according to the present disclosure can therefore be used in multiple implementation methods that result from the choice of the parameters y and m on the one hand, and from the methods of introducing the two inhibitors on the other hand.

Finally, it should be noted that the inventors of this application have also observed that the combined use of magnesium and yttrium improves, as compared to yttrium alone, the quality of protection against combined vanadium pentoxide and sodium sulfate corrosion, the said protection being already an advantage claimed by the process described in U.S. Pat. No. 5,637,118. This result could possibly be explained by the formation of a mixed sodium/magnesium sulfate where the sodium sulfate is blocked according to the following reaction (10):

$$Na_2SO_4 + 3MgSO_4 \rightarrow Na_2Mg_3(SO_4)_4 \quad (10)$$

Thus, the present disclosure concerns a process for inhibiting high temperature corrosion of the hot parts of thermal equipment that burns a vanadium-contaminated fuel in the presence or absence of sodium. This process is characterized in that, in a furnace of the said thermal equipment, the following are introduced per mole of vanadium pentoxide formed during combustion:

a number y, varying from 0.05 to 0.95, of mole of yttrium oxide, and a number of moles of magnesium oxide equal to $m*(1-y)$, m varying from 3 to 15 and preferably being equal to 12.6, the inhibition of the vanadium taking place according to the equation (9):

$$V_2O_5 + yY_2O_3 + m(1-y)MgO \rightarrow 2yYVO_4 + (1-y)Mg_3V_2O_8 + (1-y)(m-3)MgO, \quad (9)$$

where y and m are those as defined above.

The inhibition of the vanadium is then complete because it is carried out with an excess of magnesium, according to the overall reaction following the equation (9). It is understood that although the category "oxide" is used to define the yttrium and magnesium compounds to be introduced, one can also introduce any other yttrium (or magnesium) compound that is capable of generating yttrium oxide (or magnesium oxide) in the furnace. It is also understood that the expression "is introduced into the furnace" does not necessarily mean direct injection into the furnace, the introduction can also take place upstream of the furnace in any circuit that terminates at the said furnace.

This combined inhibition method has the advantages that with respect to yttrium inhibition as described in U.S. Pat. No. 5,637,118, the inhibition cost is reduced and the protection against combined vanadium pentoxide and sodium sulfate corrosion is reinforced. Further, with respect to conventional magnesium inhibition, the emission of leachable magnesium orthovanadate is reduced, the ash deposition on the hot parts of the thermal equipment and the correlative losses of performance are reduced, the adverse interference of alkali metals that may be present in the fuel arriving in the furnace is reduced: the loss of performance by fouling of the hot parts, also in the presence of alkali metals, is thus minimized, the flame temperature is increased beyond the technical limit on the order of 1090° C.

In one embodiment, the fuel is also contaminated with sodium. In one embodiment, the thermal equipment is a gas turbine whose flame temperature is less than, equal to or greater than 1090° C. In one embodiment, two separate inhibitors based on yttrium and magnesium precursors respectively can be used. For example, the yttrium oxide is generated from a fat soluble or water soluble precursor, the said precursor being contained in an additive called yttrium-based inhibitor. For example, the magnesium oxide is generated from a fat soluble or water soluble precursor, the said precursor being contained in an additive called magnesium-based inhibitor.

In another embodiment, an inhibitor combining these two precursors can be used, the additives concerned may be water soluble or fat soluble. In another embodiment:

the precursor of the yttrium oxide is preferably yttrium nitrate, an yttrium sulfonate, an yttrium carboxylate, an yttrium chloride, or a nanometric yttrium compound in suspension in a hydrophilic or lipophilic solvent, and the precursor of the magnesium oxide is an inorganic magnesium salt, a magnesium sulfonate, a magnesium carboxylate, or a nanometric magnesium compound in suspension in a hydrophilic or lipophilic solvent.

In another embodiment, one of the two inhibitors is introduced directly into the fuel or into the furnace or, upstream of the furnace, into any of the supply circuits of the furnace of the thermal equipment, and the other inhibitor is introduced at a location different from the first inhibitor, for example by mixing it into the fuel, for example in a mixing, storage or recirculation tank before sending it into any of the supply circuits of the furnace of the thermal equipment. In another embodiment:

either both inhibitors are introduced directly into the fuel or into the furnace or upstream of the furnace into one of the supply circuits of the furnace;

or they are mixed directly with the fuel, for example in a mixing tank before they are circulated through any of the circuits terminating at the furnace of the thermal equipment.

Supply circuits of the thermal equipment furnace are understood to mean, for example, a fuel supply circuit, or a water supply circuit, or a water/fuel oil emulsion circuit, or an atomizing air circuit. Furthermore, direct injection into the furnace is understood to mean that for example an inlet provided for direct injection into the furnace of either a cleaning product or a combustion improvement product, is used. For example, in a gas turbine combustion chamber, particles are injected to clean the first turbine stages. Thus, according to one embodiment, the injection of any of these two inhibitors is carried out:

either upstream of the furnace and via a fuel supply circuit or a water supply circuit or an atomizing air circuit of the said furnace, or directly into the furnace, in particular via a nozzle used for the injection of particles designed for cleaning the turbine or via a dedicated nozzle.

In another embodiment, the parameter y is chosen to be at least equal to 0.9. In this case, the performance losses due to fouling and the emission of magnesium vanadate particles are minimized. In another embodiment, the parameter y is chosen to be at most equal to 0.1. In this case, the inhibition cost is minimized. The balance equation (9) of the inhibition is then written, by taking y=(1−e), as the equation (11):

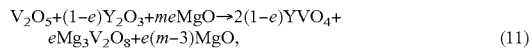

$$V_2O_5+(1-e)Y_2O_3+meMgO \rightarrow 2(1-e)YVO_4+eMg_3V_2O_8+e(m-3)MgO, \quad (11)$$

the number represent by e having a low value, for example equal to 0.1. In another embodiment, the parameter y is chosen to be greater than value $y_1$ so as to obtain a power loss rate for the thermal equipment that is less than a predetermined limit. In another embodiment, the parameter y is chosen to be greater than value $y_2$ so as to obtain an operating time between two consecutive washes of the turbine that is greater than a predetermined limit.

EXAMPLES

Example 1

A highly contaminated fuel containing 150 mg vanadium (V) per kilogram (or 150/50.9=2.97 milliatoms of V per kg fuel) is burned in a gas turbine whose flame temperature is 1088° C. (therefore practically at the 1090° C. technical limit level) and which has a power output of 101 MWe (e.g., electrical MW). The criterion chosen by the operator for activation of a turbine wash is a 5% loss in power due to fouling, so that the operator shuts down the turbine when it has lost 0.05*101=5.05 MW and performance has therefore fallen to 101−5.05 or approximately 96 MW. Initially, he also applies conventional magnesium inhibition which requires the injection of 150*3=450 mg Mg per kg fuel and is carried out according to the following balance equation (2b):

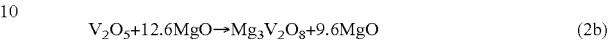

$$V_2O_5+12.6MgO \rightarrow Mg_3V_2O_8+9.6MgO \quad (2b)$$

The emission of magnesium orthovanadate (PM=302.7), calculated on the basis of the number of vanadium atoms, is equal to: [(150/50.9)/2]*302.7=446 mg of $Mg_3V_2O_8$ per kg burned fuel.

Furthermore, the operator observes that the loss of power due to fouling of the turbine takes place at an average rate of 51 kWe per operating hour, which results in an operating time of 5.05/0.051 or approximately 100 hours between two consecutive washes. The operator decides to switch to a combined yttrium/magnesium inhibition method according to the process in accordance with the present embodiment, because he wishes, on the one hand, to reduce the emission of magnesium-vanadium particles and, on the other hand, to increase the availability of his machine by reducing by a factor of 3 the power loss rate due to fouling: he therefore targets a power loss rate on the order of 51/3=17 kW/h.

Based on previously conducted tests during which he monitored the loss of power as a function of the parameter y of the combined inhibition method, the operator has determined that the value $y_1$ to be used to reach this objective is on the order 0.93 by taking a value of 12.6 for the parameter m, which, according to equation (9), yields the following inhibition balance equation (12):

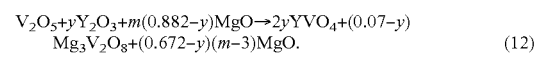

$$V_2O_5+yY_2O_3+m(0.882-y)MgO \rightarrow 2yYVO_4+(0.07-y)Mg_3V_2O_8+(0.672-y)(m-3)MgO. \quad (12)$$

In this combined inhibition, the atomic weight of yttrium being 88.9 g/mole, the operator has to inject:

yttrium: 2.97*0.93*88.9=245.6 mg of Y per kg of fuel.

magnesium: 450/12.6*0.88=31.4 mg of Mg per kg of fuel.

This change in inhibition method decreases the emission of magnesium orthovanadate from 446 mg to 446*0.07=31.2 mg $Mg_3V_2O_8$ per kg burned fuel: it is therefore divided by a factor of 14. Simultaneously, the performance loss rate effectively falls from 51 kW/h to around 16.5 kW/h. As a result, the operating time possible between two washes increases from 100 hours to 5.05/0.0165=306 hours.

The operator has therefore succeeded in tripling the operating time of its turbine between two washes. Since a complete washing operation, which includes shutdown, cool-down, water washing, spinning, and restart of the turbine, takes around 15 hours, the availability of the gas turbine which was 100/(100+15)=90% with conventional magnesium inhibition, becomes: 306/(306+15)=95% with yttrium inhibition. The operator thus sees the availability of its turbine increase by 5%, while the emission of magnesium orthovanadate is divided by 14. As magnesium/yttrium based inhibitors, the operator uses an aqueous solution containing 2% magnesium in the form of magnesium nitrate and 15.6% yttrium in the form of yttrium nitrate, a solution that is directly injected into the low pressure section of the fuel circuit, via a high speed rotary mixer that ensures the emulsification of this solution in the fuel. Taking into account the high quantities of vanadium to be inhibited, this option of water soluble inhibitors is economically more interesting than the option of fat soluble inhibitors.

Example 2

A lowly contaminated fuel containing 30 mg V per kilogram (or 30/50.9=0.589 milliatom of V per kg fuel), is burned in a gas turbine whose flame temperature is also 1088° C. (therefore practically at the 1090° C. technical limit level) and which has a power output of 38 MWe (e.g., electrical MW).

Initially, the operator also applies conventional magnesium inhibition which requires the injection of 30*3=90 mg Mg per kg fuel and is carried out according to the following balance equation:

$$V_2O_5 + 12.6 MgO \rightarrow Mg_3V_2O_8 + 9.6 MgO \qquad (2b)$$

This time, the operator does not wish to increase the availability of its turbine because its operating strategy includes activating a turbine wash every 6 days (i.e., every 145 hours), as it is more economical to carry out these washes on Sundays, when demand for electricity is low. Instead, the operator wishes to increase the productivity of its facility, with a 5% gain in electricity production as target. With conventional magnesium inhibition, the loss of power due to fouling of the turbine takes place at an average rate of 21 kWe per operating hour. After 145 operating hours, the turbine has therefore lost 0.021*145=3.045 MWe and performance has fallen to 38−3.045=34.96 MWe. Consequently, the average power output over the 145 hour operating time between two washes is (38+34.96)/2=36.48 MWe and the quantity of electricity generated is 145*36.48=5290 MWh.

Based on previously conducted tests during which he monitored the loss of power as a function of the parameter y of the combined inhibition method, the operator has determined that the value $y_2$ to be used to reach this objective is on the order 0.75 by taking a value of 12.6 for the parameter m, which, according to equation (9), yields the inhibition balance equation (13):

$$V_2O_5 + 0.75 Y_2O_3 + 3.15 MgO \rightarrow 1.5 YVO_4 + 0.25 Mg_3V_2O_8 + 2.4 MgO. \qquad (13)$$

In this combined inhibition according to the process in accordance with the present embodiment, the operator must therefore inject:

yttrium: 0.589*0.75*88.9=39.2 mg of Y per kg of fuel.
magnesium: 90/12.6*3.15=22.5 mg of Mg per kg of fuel.

The operator establishes that the power loss rate falls from 21 kW/h to approximately 10.05 kW/h. After 145 hours, the turbine has therefore lost 0.0105*145=1.523 MWe and performance has therefore fallen to 38−1.523=36.477 MWe. Consequently, the average power output over the 145 hour operating time between two washes is (38+36.477)/2=37.24 MWe. Thus, over an operating time between two washes, the operator who wished to increase his production, wins on average 37.24−34.96=2.28 MWe: over this time he therefore generates 2.28*145=330 MWh more electricity. The gain obtained by switching to combined yttrium/magnesium inhibition according to the process in accordance with the present embodiment, amounts to 330/5290=6.2%. He has therefore slightly exceeded the targeted 5% gain.

One can furthermore determine that this change in inhibition method causes the emission of magnesium orthovanadate to fall from 446 mg to 112 mg $Mg_3V_2O_8$ per kg burned fuel: it is therefore divided by a factor of approximately 4. The operator uses separate magnesium and yttrium inhibitors, both of the fat soluble type: the magnesium-based inhibitor is a magnesium sulfonate solution with 11% magnesium in a heavy aromatic naphtha and the yttrium-based inhibitor is an yttrium octoate solution with 5% yttrium, also in a heavy aromatic naphtha. These inhibitors are injected in online mode into the low-pressure section of the fuel circuit with the aid of two distinct dosing pumps, but at the same point where a single static mixer is installed to ensure their mixing with the fuel.

Example 3

The turbine and the fuel that it burns are identical to those in example 2 above. The operator who initially uses conventional magnesium inhibition, has at the turbine inlet a fuel that is free of alkali metals thanks to water washing of the fuel carried out by a fuel treatment system based on centrifugal separators that ensures a residual sodium content of less than 1 ppm in weight at the inlet of the turbine, thereby preventing the adverse effect of metals on fouling of the turbine. He observes an inadvertent malfunction of his fuel treatment system resulting in a residual sodium content on the order of 10 ppm. Correlatively, he observes that the power loss rate due to fouling increases from 21 kWe to 30 kWe, reducing the production and the efficiency of his machine. He then decides to switch to a combined yttrium/magnesium inhibition method in accordance with the present disclosure, with the same parameter y as in example 2, i.e., y=0.75. After switching to this combined inhibition method and before he has resolved the malfunction of his fuel treatment system that results in a high sodium content at the turbine inlet, the operator observes, over two consecutive operating times of 100 hours, that the power loss rate is only 12 kW/h, or a reduction by a factor of 30/12=2.5 of the performance loss incurred when conventional magnesium inhibition was applied.

Example 4

The turbine and the fuel that it burns are identical to those used in example 2 above. The operator initially applies conventional magnesium inhibition and again wishes to increase the productivity of his facility by increasing the efficiency of his turbine, for which purpose he envisages to switch to a flame temperature of 1140° C., which corresponds to a 47° C. increase with respect to the initial value of 1088° C. For this, he decides to switch to combined yttrium/magnesium inhibition according to the process in accordance with the present disclosure, with a value of y of 0.95 and value 12.6 for the parameter m. The corresponding inhibition equation (14) is as follows:

$$V_2O_5 + 0.95 Y_2O_3 + 0.63 MgO \rightarrow 1.9 YVO_4 + 0.05 Mg_3V_2O_8 + 0.48 MgO \qquad (14)$$

Over several wash cycles, the operator observes that:
the initial power (machine washed) increases from 100 MWe to 112 MWe,
the power loss rate remains at a level of 15 kW per hour.
Moreover, the emission of orthovanadate falls from 892 mg to 892*0.05=45 mg per kg burned fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process for inhibiting vanadium-induced corrosion in high temperature parts of thermal equipment during occasions when the thermal equipment combusts a fuel containing vanadium, the process comprising:
introducing vanadium corrosion inhibitors into a fluid flow path of the thermal equipment, wherein combustion of the fuel containing vanadium in the thermal equipment results in the formation of vanadium pentoxide ($V_2O_5$); and
reducing an amount of $V_2O_5$ by causing a reaction between $V_2O_5$ and the vanadium corrosion inhibitors;
wherein the vanadium corrosion inhibitors comprise an yttrium-based inhibitor comprising yttrium oxide ($Y_2O_3$) and a magnesium-based inhibitor comprising magnesium oxide (MgO).

2. The process of claim 1, wherein the reducing of the amount of $V_2O_5$ by the reaction of $V_2O_5$ with the vanadium corrosion inhibitors inhibits vanadium-induced corrosion according to the reaction:

$$V_2O_5 + yY_2O_3 + m(1-y)MgO \rightarrow 2yYVO_4 + (1-y)Mg_3V_2O_8 + (1-y)(m-3)MgO,$$

wherein y is from 0.05 to 0.95, and m is from 3 to 15.

3. The process of claim 1, wherein the fuel contains sodium.

4. The process of claim 1, wherein the thermal equipment comprises a gas turbine having a flame temperature that is equal to or greater than 1090 degrees Celsius.

5. The process of claim 1, comprising generating the $Y_2O_3$ from a fat soluble or water soluble precursor contained in an additive of the yttrium-based inhibitor.

6. The process of claim 5, wherein the precursor of the $Y_2O_3$ comprises an inorganic yttrium salt, yttrium sulfonate, an yttrium carboxylate, an yttrium chloride, or a nanometric yttrium compound in suspension in a hydrophilic or lipophilic solvent.

7. The process of claim 1, comprising generating the MgO from a fat soluble or water soluble precursor contained in an additive of the magnesium-based inhibitor.

8. The process of claim 7, wherein the precursor of the MgO comprises an inorganic magnesium salt, a magnesium sulfonate, a magnesium carboxylate, or a nanometric magnesium compound in suspension in a hydrophilic or lipophilic solvent.

9. The process of claim 1, wherein the introducing of the vanadium corrosion inhibitors into the fluid flow path of the thermal equipment comprises introducing one or both of the yttrium-based inhibitor and the magnesium-based inhibitor into one of a plurality of components along a fuel flow path of the thermal equipment, wherein the plurality of components comprises a fuel tank, a furnace, and fuel supply circuits upstream of the furnace.

10. The process of claim 9, wherein the introducing of the vanadium corrosion inhibitors into the fluid flow path of the thermal equipment comprises introducing the yttrium-based inhibitor into a first component of the plurality of components and introducing the magnesium-based inhibitor into a second component of the plurality of components, the second component being different from the first component.

11. The process of claim 1, wherein the introducing of the vanadium corrosion inhibitors into the fluid flow path of the thermal equipment comprises injecting one or both of the yttrium-based inhibitor and the magnesium-based inhibitor into a water supply circuit or an atomizing air circuit of a furnace of the thermal equipment.

12. The process of claim 1, wherein the introducing of the vanadium corrosion inhibitors into the fluid flow path of the thermal equipment comprises injecting one or both of the yttrium-based inhibitor and the magnesium-based inhibitor into a furnace of the thermal equipment via a nozzle, wherein the nozzle is a dedicated nozzle or is configured to inject particles designed for cleaning a turbine of the thermal equipment.

13. The process of claim 2, wherein y is at least from 0.9 to 0.95.

14. The process of claim 2, wherein y is at most 0.1.

* * * * *